United States Patent [19]

Kageyama

[11] 4,456,108
[45] Jun. 26, 1984

[54] CONTROL SYSTEM FOR A FOUR-WHEEL DRIVE VEHICLE

[75] Inventor: Hayashi Kageyama, Ohta, Japan

[73] Assignee: Fuji Jukogyo Kabushiki Kaisha, Tokyo, Japan

[21] Appl. No.: 303,452

[22] Filed: Sep. 18, 1981

[30] Foreign Application Priority Data

Oct. 9, 1980 [JP] Japan .................. 55-142260

[51] Int. Cl.$^3$ .................. B60K 41/24; F16D 37/02
[52] U.S. Cl. .................. 192/4 A; 192/9; 192/21.5
[58] Field of Search ............ 192/4 A, 9, 4 R, 3.58, 192/0.082, 0.094, 21.5, 0.055, 12 D, 13 R, 13 A

[56] References Cited

U.S. PATENT DOCUMENTS

| 2,227,412 | 12/1940 | Stortz | 192/0.055 |
| 2,946,238 | 7/1960 | Beyerstedt | 180/244 X |
| 3,163,272 | 12/1964 | Baumann | 192/3.56 |
| 3,628,642 | 12/1971 | Ravenel | 192/4 A |
| 3,656,600 | 4/1972 | Kitano et al. | 192/0.055 |

FOREIGN PATENT DOCUMENTS 738295 10/1955 United Kingdom ............ 192/13 R

Primary Examiner—George H. Krizmanich
Attorney, Agent, or Firm—Martin A. Farber

[57] ABSTRACT

A system for a four-wheel drive vehicle for automatically changing the transmission of the engine of the vehicle from two-wheel drive to four-wheel drive when braking. The transmission transmits power from the engine to two main driving wheels, and an electromagnetic clutch having a magnetizing coil is provided for transmitting the power of the engine to the two-wheels. A brake switch is provided for producing a signal when the brake pedal is depressed a predetermined stroke, and a control circuit is provided for allowing the clutch current to pass through the coil of the electromagnetic clutch when the signal from the brake switch is applied.

7 Claims, 2 Drawing Figures

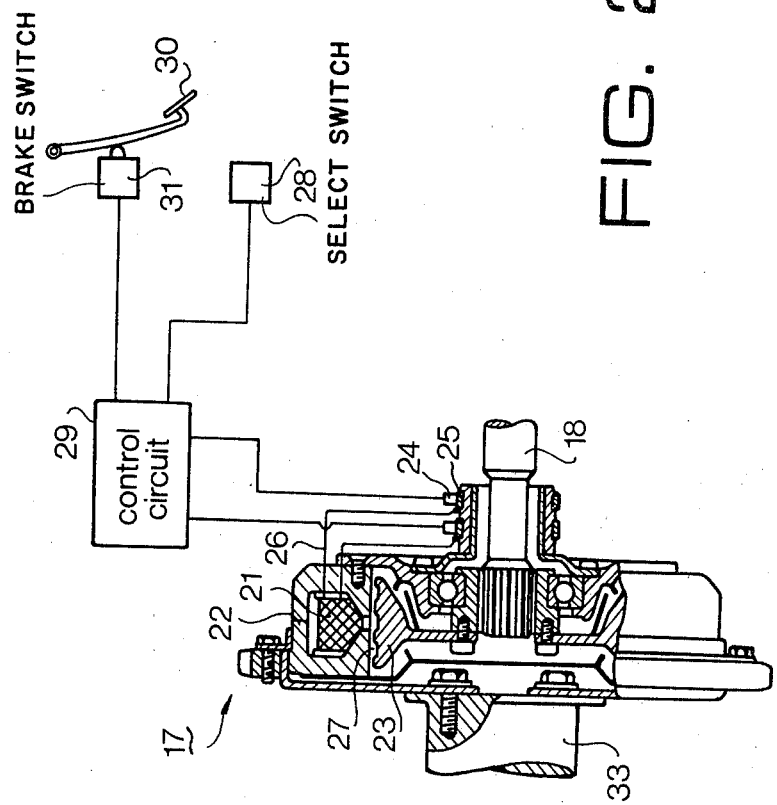

CONTROL SYSTEM FOR A FOUR-WHEEL DRIVE VEHICLE

BACKGROUND OF THE INVENTION

The present invention relates to a system for a four-wheel drive vehicle convertible to two-wheel driving, and more particularly to a system for automatically changing the transmission from two-wheel drive condition to the four-wheel drive condition.

Sudden braking may cause dangerous slipping of the vehicle, which is caused by rocking of the wheels with brakes. In the four-wheel drive vehicle, since the front wheels and the rear wheels are connected with each other through the propeller shaft, either the front or the rear wheels are driven by the other wheels. Therefore, slipping of only the front or the rear wheels does not occur. This means that the four-wheel drive vehicle has a safe braking effect and safety in the steering operation.

SUMMARY OF THE INVENTION

Therefore, the present invention provides a four-wheel drive vehicle, a transmission system of which is automatically changed from the two-wheel driving condition to the four-wheel driving condition under the braking condition.

According to the present invention, there is provided a system for controlling two-wheel and four-wheel drives in a vehicle powered by an internal combustion engine having a transmission for transmitting power from the engine to two main driving wheels, a clutch for selectively transmitting the power to two remaining wheels, and a select switch for engaging the clutch, the improvement comprising a brake operable to produce a signal when the brake of the vehicle is depressed a predetermined stroke and a control circuit responsive to the signal for engaging the clutch for establishing the four-wheel driving condition.

The present invention will be explained more in detail with reference to the accompanying drawings.

BRIEF DESCRIPTION OF DRAWINGS

FIG. 2 is a block diagram of a control system for the system.

DESCRIPTION OF PREFERRED EMBODIMENT

Figure 1:
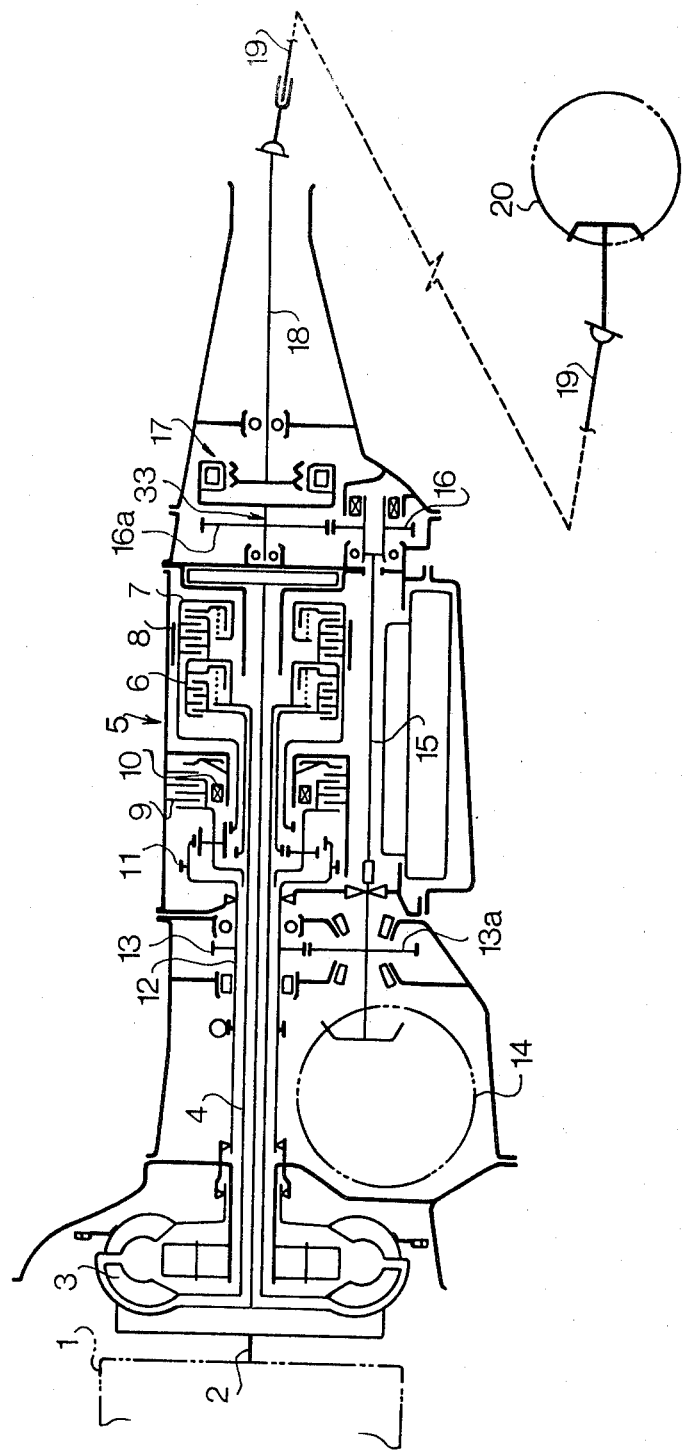
FIG. 1 is a cross-sectional view showing an embodiment of a system in accordance with the present invention.

In the drawings, an internal combustion engine 1 has a crankshaft 2 of the engine. The crankshaft 2 is connected to a trans-axle type transmission which comprises a torque converter 3 and an automatic transmission device 5 having an input shaft 4 connected to the torque converter. The automatic transmission comprises clutches 6, 7, a brake band 8, a brake 9, a one-way clutch 10 and a planetary gear 11 operatively connected as shown. An output shaft 12 of the transmission is connected to the planetary gear 11 and is connected to a final reduction gear 14 through reduction gears 13, 13a. The final reduction gear 14 is connected to front wheels (not shown) of the vehicle. The shaft 15 of the gear 13a extends rearwardly and a gear 16 is secured to a rear end of the shaft 15. The gear 16 meshes with a gear 16a which is connected via a shaft 33 to an electromagnetic powder clutch 17 for rear wheels (not shown) of the vehicle. The electromagnetic clutch 17 is connected to a final reduction gear 20 for the rear wheels through a shaft 18 and a propeller shaft 19.

Referring to FIG. 2, the electromagnetic powder clutch 17 comprises a drive member 22 connected to the shaft 33, a magnetizing coil 21 provided in the drive member 22, a driven member 23 secured to the shaft 18, and magnetic powder provided in the clutch. Clutch current flows from a control circuit 29 to the magnetizing coil 21 through brushes 24, slip rings 25 and a lead 26.

When the magnetizing coil 21 is excited, the magnetic powder is aggregated in a space 27 between the inner surface of the driving member 22 and the peripheral surface of the driven member 23. Thus, the clutch is engaged through the magnetic powder.

A manually operated select switch 28 is connected to the control circuit 29 for engaging the clutch 17. Further, a brake switch 31 is operatively connected to a brake pedal 30 and is closed when the brake pedal 30 is depressed a predetermined stroke. A switch operated by brake oil pressure may be used in place of the brake pedal. The brake switch 31 is also connected to the control circuit 29. The control circuit 29 comprises switching means which is adapted to close the circuit of the magnetizing coil 21 for exciting the coil when the select switch 28 or the brake switch 31 is closed.

In operation, when the select switch 28 is in a front-wheel driving position which is a switch open position, the circuit for the magnetizing coil 21 in the control circuit 29 is opened. Thus, the electromagnetic clutch 17 is disengaged and therefore the vehicle is only driven by the front wheels. If the select switch 28 is operated to select the four-wheel driving condition, the control circuit 29 is closed for exciting the magnetizing coil 21. Thus, the power from the crankshaft 2 of the engine is also transmitted to the rear wheels through the gears 16, 16a, the electromagnetic clutch 17 and the propeller shaft 19, establishing the four-wheel driving condition.

When the brake pedal 30 is depressed a predetermined stroke during the front-wheel driving condition, the brake switch 31 is closed which closes the circuit for the magnetizing coil. Thus, the power transmitting system of the vehicle is changed to the four-wheel driving condition.

In accordance with the present invention, the two-wheel driving condition is changed to the four-wheel driving condition by braking. Thus, slipping and skidding of the wheels of the vehicle can be prevented and safe steering may be expected by the four-wheel driving effect. It will be understood that the electromagnetic clutch for the four-wheel driving may be substituted for a hydraulic clutch and that a manual transmission may be used instead of the automatic transmission.

What is claimed is:

1. In a system in a vehicle for controlling a clutch of a disengageable four-wheel drive powered by an internal combustion engine, the vehicle having a vehicle braking condition detector, a transmission operatively connected to a crankshaft of said engine for transmitting power of said engine, a final reduction device connected to an output gear of said transmission for transmitting the output of said transmission to two main driving wheels of the vehicle, the clutch when engaged for further transmitting said output of said transmission to two auxiliary driving wheels of the vehicle, and the system having a select switch operatively connected to said clutch through a control circuit means for selectively engaging said clutch, the improvement in the system which comprises
- switch means operatively connected with said vehicle braking condition detector for producing an output signal when the vehicle is in a braking condition, and
- said control circuit means is responsive to said output signal for engaging said clutch so as to establish the four-wheel drive when the vehicle is in the braking condition.

2. The system according to claim 1, wherein said clutch is an electromagnetic clutch.

3. The system according to claim 2, wherein said clutch is a powder clutch.

4. The system according to claim 1, wherein said transmission is an automatic transmission.

5. The system according to claim 1, wherein
said vehicle has a brake pedal constituting said vehicle braking condition detector,
said switch means is operatively connected to said brake pedal so as to produce said output signal and thereby operatively engage said clutch via said output signal and said control circuit means when said brake pedal is depressed beyond a predetermined stroke.

6. The system according to claim 1, wherein
said vehicle braking condition detector is a brake oil pressure means,
said switch means is operatively connected to said brake oil pressure means so as to produce said output signal and thereby operatively engage said clutch via said output signal and said control circuit means.

7. In a system in a vehicle for controlling a clutch of an engageable four-wheel drive powered by an internal combustion engine, the vehicle having a transmission operatively connected to a crankshaft of said engine for always transmitting the power of said engine to two main driving wheels of the vehicle whenever the vehicle is driven, the clutch when selectively engaged for further transmitting said power of the engine via said transmission to two auxiliary driving wheels of the vehicle, and the system having a select switch operatively connected to said clutch for selectively engaging said clutch, the improvement in the system which comprises
- a vehicle braking condition detector,
- means operatively connected with said vehicle braking condition detector for engaging said clutch so as to establish the four-wheel drive when the vehicle is in a braking condition and had been in a two-wheel drive condition.

* * * * *